United States Patent [19]
Modrey

[11] 3,848,902
[45] Nov. 19, 1974

[54] LINE COUPLING

[76] Inventor: Henry J. Modrey, 930 Camellia Dr., Royal Palm Beach, Fla. 33406

[22] Filed: Aug. 16, 1972

[21] Appl. No.: 281,120

[52] U.S. Cl.............. 285/137 R, 285/39, 285/161, 285/176, 285/242, 285/250
[51] Int. Cl............................................. F16l 39/02
[58] Field of Search ..... 285/239, 238, 240, DIG 22, 285/250, 397, 399, 109, 39, 260, 345, 346, 242, 258, 257, 174, 176, 161, 137 R, 237, 213

[56] References Cited
UNITED STATES PATENTS

| | | | |
|---|---|---|---|
| 274,951 | 4/1883 | Luther................................ | 285/174 |
| 655,688 | 8/1900 | Coleman et al...................... | 285/237 |
| 867,108 | 9/1907 | Carmer................................ | 285/258 |
| 1,668,978 | 5/1928 | Rhinevault.......................... | 285/213 |
| 1,901,897 | 3/1933 | Clayton................................ | 285/176 |
| 1,928,837 | 10/1933 | Loughead .......................... | 285/258 |
| 2,567,773 | 9/1951 | Krupp.............................. | 285/260 X |
| 2,864,378 | 12/1958 | Schneller ........................ | 285/239 X |
| 2,902,298 | 9/1959 | Kolthoff.............................. | 285/239 |
| 3,114,969 | 12/1963 | Roth .............................. | 285/239 X |
| 3,122,383 | 2/1964 | Hirsch................................ | 285/397 |

FOREIGN PATENTS OR APPLICATIONS

| | | | |
|---|---|---|---|
| 903,768 | 2/1954 | Germany ........................... | 285/238 |
| 1,257,935 | 2/1961 | France............................... | 285/260 |

*Primary Examiner*—Thomas F. Callaghan
*Attorney, Agent, or Firm*—Hane, Baxley & Spiecens

[57] ABSTRACT

There is disclosed a line coupling for sealingly coupling a flexible tubing to a receiver or connector. The coupling comprises a springy tubular member which is capable of lengthwise contraction and expansion and which can be snugly fitted into the end of the tubing to be coupled to the receiver. The receiver has a receiving opening, the diameter of which is slightly less than the outer diameter of the tubing portion into which the tubular member is inserted. Insertion of this tubing portion into the receiver opening causes a compression of the tubular member and this compression in turn causes an internal outwardly directed pressure against the tubing wall thereby pressing the same against the wall of the receiver opening in sealing engagement therewith.

9 Claims, 12 Drawing Figures

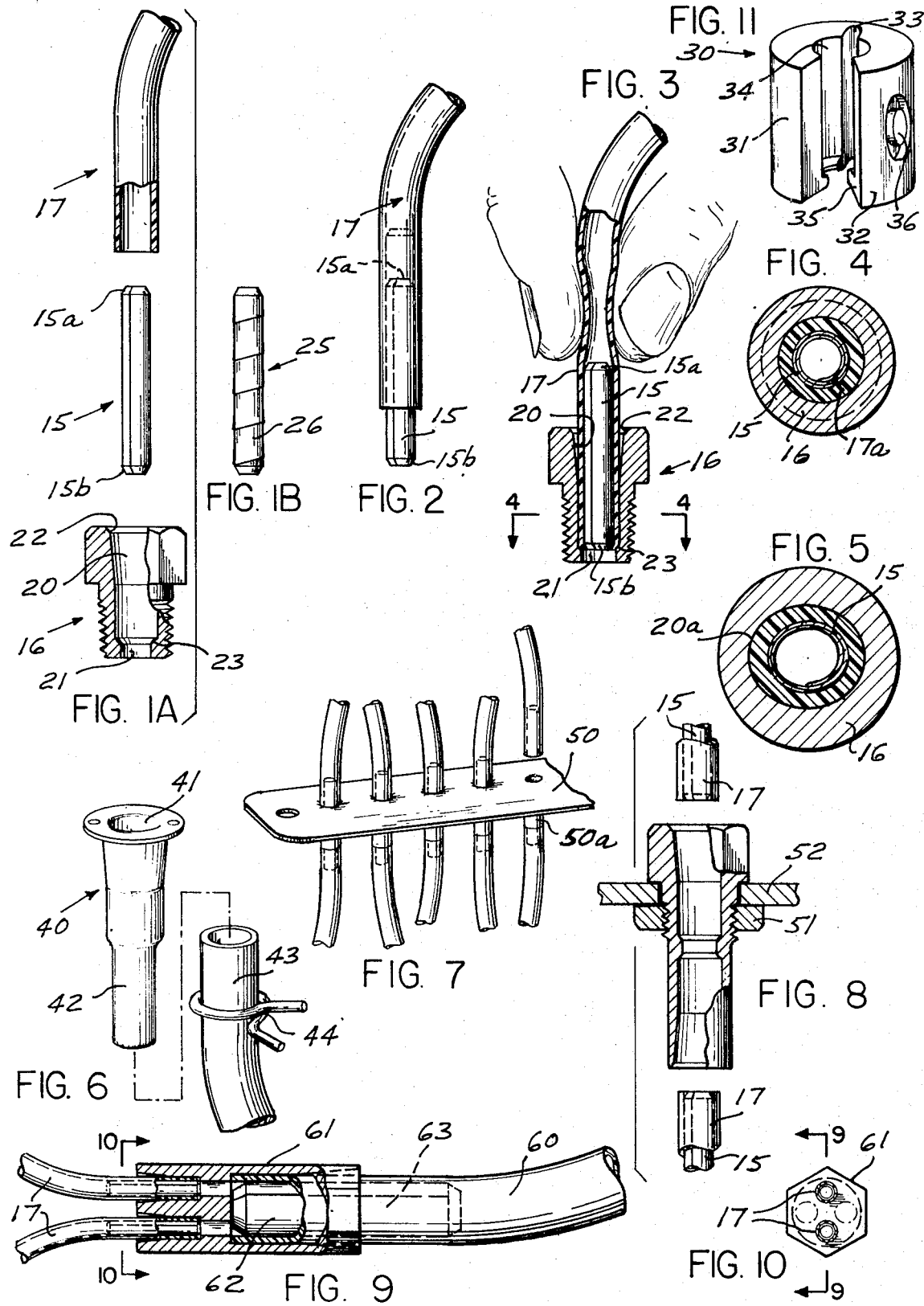

LINE COUPLING

The present invention relates to a line coupling and more particularly to a line coupling for coupling a flexible tubing such as a plastic or rubber tubing to a receiver or connector in sealing relationship.

BACKGROUND

There are now known line couplings in which coupling is effected by a connector in which a screw net presses an O-ring upon the tubing. Line couplings of this kind are fairly inexpensive, but they have the disadvantage that they require considerable steps outside of the coupling for application and manipulating of the tool required for tightening the screw nut.

There are also known line couplings in which coupling is effected by means of a machined split chuck and a separate sleeve. With such couplings the tubing is inserted into the chuck and the sleeve is then pushed upon the tubing whereupon the chuck is tightened for sealing the tubing to the receiver. Such chuck-and-sleeve couplings do not require the large outside space needed for couplings using an O-ring, but they are rather expensive and require several time-consuming operations.

The afore-mentioned and other known line couplings all have in common that sealing is effected by external pressure.

THE INVENTION

The invention resides in a concept which departs radically from the heretofore exclusively used concept of external pressure upon the tubing in that sealing of the tubing to the receiver is effected by internal pressure. Tests have shown that with such internal pressure very effective sealing pressures can be readily obtained.

More specifically, it is a broad object of the invention to provide a novel and improved line coupling which does not require substantial outside space for effecting sealing of the tubing to a receiver or connector, and which can be less expensively manufactured than line couplings as heretofore known. Costs are an important factor with couplings of the kind here involved as such couplings are used in very large quantities in various installations and building constructions.

Another object of the invention is to provide a novel and improved line coupling with which sealing is effected by subjecting the tubing to internal pressure causing an expansion of the tubing into sealing engagement with the wall of the receiving opening of the receiver.

Another more specific object of the invention is to provide a novel and improved line coupling in which a springy tubular member within the tubing portion inserted into the receiving opening of the receiver exerts an outwardly directed internal pressure upon the tubing wall thereby pressing this wall against the surrounding wall of the receiving opening, in sealing engagement therewith.

Still another more specific object of the invention is to provide a novel and improved line coupling for coupling two or more tubings to a common tube by means of a receiver including a corresponding number of receiving openings to the walls of which the two or more tubings are sealed by internal pressure. All of these openings are in communication with the common tube also coupled to the receiver.

BRIEF SUMMARY OF THE INVENTION

The aforepointed out objects, features and advantages of the invention and other objects, features and advantages which will be pointed out hereinafter are obtained by providing a springy tubular member which is capable of lengthwise contraction and expansion along its length and which snugly fits into the tubing end to be coupled to a receiver. The tubing end with the tubular member inserted thereinto is fitted into a receiver opening the diameter of which is slightly less than the outer diameter of the tubing with the tubular member inserted thereinto. Insertion of this tubing end causes a compression of the tubular member via the wall of the tubing and such compression in turn results in an outwardly directed internal pressure which presses the tubing wall into sealing engagement with the wall of the receiver opening. By suitably selecting the differential between the outer diameter of the tubing and the diameter of the receiver opening the psi value of the sealing engagement can be selected within a very wide range.

The springy tubular member may be formed of a spirally wound strip of suitable springy material such as sheet metal or plastic or it may be formed of a helically wound narrow strip or wire of springy material.

BRIEF DESCRIPTION OF THE INVENTION

In the accompanying drawing, several embodiments of the invention are shown by way of illustration and not by way of limitation.

In the drawing:

FIG. 1A is an exploded view of a line coupling according to the invention showing tubing to be coupled, a springy insert to be inserted into the tubing and a receiver or connector, partly in section.

FIG. 1B is a modification of the springy insert of FIG. 1A.

FIG. 2 shows the insert of FIG. 1A partly inserted into the tubing.

FIG. 3 is an elevational sectional view showing the insertion of the tubing with the insert therein into the receiver.

FIG. 4 is a section taken on line 4—4 of FIG. 3 on an enlarged scale.

FIG. 5 is a section similar to FIG. 4 showing a modification of the receiver.

FIG. 6 is an elevational view of a modification of the receiver or connector.

FIG. 7 is a perspective view of a multiple receiver.

FIG. 8 is an elevational sectional view of a further modification of the receiver.

FIG. 9 is a lengthwise sectional view of a receiver or connector for coupling two or more tubings to a common tubing taken on line 9—9 of FIG. 10.

FIG. 10 is a plan view of FIG. 9 taken in the direction of arrows 10—10; and

FIG. 11 is a perspective view of a tool for assembling a line coupling according to the invention.

DETAILED DESCRIPTION OF THE INVENTION

Referring now to the figures more in detail and first to the line coupling exemplified in FIG. 1A, this figure shows a springy tubular insert 15 and a receiver or connector 16. The insert serves to couple a flexible tubing 17 such as a tubing made of a suitable synthetic plastic material or rubber to receiver 16 in sealing engagement therewith.

The insert 15 is a spirally wound tubular member. It may be wound of flat stock such as light guage metal or plastic provided only that the material is springy and sufficiently inert to the fluids for which the tubing is intended. It is generally advisable that the insert is wound with several layers but in some instances, a mere overlap of the lengthwise edges may be sufficient. An essential feature of the insert is that it is radially contractible and expandable. The insert is preferably beveled at both ends as it is indicated at 15a and 15b for a purpose which will be more fully explained hereinafter.

The receiver 16 is of generally conventional design; the receiver shown in FIG. 1A is of the screw type. It includes a lengthwise bore or opening 20 communicating at its bottom with a duct opening 21. The opening 20 is preferably formed at its upper or entry end with a champfer 22 and a shoulder 23 at its lower end for a purpose which will appear from the subsequent description.

Referring now to FIG. 1B, insert 25 according to this figure is similar in principle to the insert of FIG. 1A in that it is in the form of a contractible and expandable tubular member preferably beveled at both ends. It is distinguished from the insert of FIG. 1A in that it is helically wound of a suitable springy material such as steel or plastic. The insert of FIG. 1B is shown as being wound of a strip 26 but it can also be wound of wire. The turns of the springy material of which the insert is formed should be fairly closely to each other to facilitate insertion of the insert into tubing 17 with a snug fit.

Let it now be assumed that tubing 17 is to be coupled to receiver 16. For this purpose, the insert is pushed into the respective end of tubing 17. FIG. 2 shows insert 15 partly inserted into the tubing. The afore referred to beveled end 15a facilitates such insertion of the insert. In this connection it should be pointed out that the outer diameter of the insert in the relaxed state thereof is dimensioned so that it snugly fits the inner diameter of the tubing. After the insert is pushed into the tubing so that its respective end is flush with the end of the tubing, the tubing with the insert therein is ready to be pushed into receiver 16 as it is shown in FIG. 3.

To obtain the aforedescribed internal sealing pressure, the outer diameter of tubing 17 with the insert therein is such that it is larger than the inner diameter on bore 20 in the receiver 16. As a result, the tubing will not smoothly slide into the receiver opening but must be forced into the same. As a result of such forcing, insert 15 is correspondingly radially compressed. This radial compression manifests itself in an internal outwardly directed force which presses the tubing wall along its length within the receiver against the wall of the receiver opening in sealing engagement therewith. The champfer 22 and the beveled end 15b of insert 15 facilitate the insertion of the tubing into the receiver. Moreover, when the tubing is fully pressed home, that is, when its rim abuts against shoulder 21, the bevel 15b permits a slight inward bending of the tube end thereby further improving the seal between the tubing and the receiver. FIG. 4 indicates the slightly inwardly turned end of the tubing at 17a.

The correlation between the outer diameter of tube 17 and the inner diameter of receiver opening 17 is selected in accordance with the desired internal pressure with which the tubing wall is pressed by the insert against an inner receiver wall. It has been found by tests as previously mentioned that internal pressures of 200 psi and even more can be readily obtained.

As it is apparent from the previous description, insertion of the tubing into the receiver requires a certain axial pressure, the magnitude of which depends on the differential between the outer and inner diameters of the tubing and the receiver opening respectively. When the desired internal pressure is not very high, insertion can be readily manually effected. There is indicated in FIG. 3 that the two fingers of an operator constrict the tubing slightly above the inner end of the insert for utilizing the rigidity of the insert to force the tube into the receiver opening.

In the event the necessary pushing force is too high for convenient manual operation, pliers may be used but pliers may damage the tubing. Accordingly, a special tool 30 as shown in FIG. 11 is preferable for the purpose especially when the required insertion force is high. This tool comprises two halves 31, 32 made, for instance, of a suitable plastic such as nylon and joined by a hinge 33. It has been found that a so-called "life hinge" is particularly suitable, that is, a hinge in the manner of a rather thin strip of plastic material left between the two halves. The hinge permits spreading of the two halves so that the tubing can be inserted via a gap 35 into the lengthwise opening 34 defined by the two halves. By pressing the two halves toward each other, the tubing is strongly held by the tool for insertion into the receiver as described in connection with FIG. 3. Tool 30 may be manually operated, or it may be operated by a jig to which it is attached by recesses 36.

Insert 25 of FIG. 1B functions in the same manner as insert 15 except that the internal pressure exerted by the insert when compressed is generally helical rather than radial.

In the event the tubing is made of rather stiff material it has been found that the sealing quality can be improved by giving the bore or opening 20a in the receiver a slightly oval configuration as it is shown in FIG. 5. Both the tubing and the insert therein will automatically adjust themselves to the oval outline of the receiver opening. As a result, the internal pressure with which the tubing wall will be pressed against the receiver wall by the insert is correspondingly increased.

While the receiver of the heretofore described figures is of the machined type, eyelet receivers, that is, receivers which are drawn, can, of course, also be used in the same manner as described. FIG. 6 shows a receiver 40 of this kind. The receiver has a receiving opening or bore 41 dimensioned and shaped as previously described for receiving opening 20. The receiver has an extension 42 for receiving thereupon a tubing 43 to be connected to the receiver. This tubing may be held in position by any suitable fastening means, such as a spring clip 44. The receiver may be secured to a support by rivets, screws, etc.

FIG. 7 shows how a plurality of eyelet receivers can be drawn out of a panel 50.

FIG. 8 shows a machined screw type receiver similar to the receiver of FIG. 1A secured by a counternut 51 to a panel 52. FIG. 8 is readily understandable from the previous description.

FIGS. 9 and 10 show a line coupling in which several tubings 17, four such tubings being shown, are coupled to a common tube 60. Coupling is effected by providing a corresponding number of bores or receiving openings in a receiver 61. The four openings communicate at their bottom end with an opening or bore 62 upon which tubing 60 is fitted. Inserts as described in detail in connection with FIGS. 1A and 1B are used for sealing connections of tubings 17 and tubing 60. An insert 63 for coupling tubing 60 is indicated. Coupling of the four tubings 17 is as previously described.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for sealingly coupling a flexible tubing to a receiver, said coupling device comprising in combination:

a flexible tubing;

a springy tubular member capable of diametrical contraction and expansion along its entire length, said member being dimensioned to be insertable into the tubing in its expanded state;

a receiver including an elongate receiving opening having a cross-sectional outline slightly less than the outer peripheral outline of the tubing, the length of said springy tubular member being at least equal to the length of the receiving opening, said receiving opening connecting at its bottom end with a duct opening in the receiver;

insertion of the tubing with the spring member therein into the receiving opening causing a contraction of the tubular member along its entire length against the springy action thereof whereby the resulting pressure against the inner wall of the tubing as generated by the contraction of the tubular member presses the respective lengthwise wall portion of the tubing against the surrounding wall of the receiving opening in sealing engagement therewith.

2. The coupling device according to claim 1 wherein said springy tubular member is bevelled at one end 3. The coupling device according to claim 1 wherein said springy tubular member is bevelled at both ends.

4. The coupling device according to claim 1 wherein said tubular member is in the form of a spirally wound strip of springy material, said member being wound for radial expansion and contraction along its entire length.

5. The coupling device according to claim 1 wherein said tubular member is in the form of a helically wound spring, said spring being radially expandable and contractable along its entire length.

6. The coupling device according to claim 1 wherein the receiving opening in said receiver is formed with a chamfer at the entry end for the tubing.

7. The coupling device according to claim 1 wherein the receiving opening in said receiver has at its inner end a peripheral internally protruding flange.

8. The coupling device according to claim 1 wherein the receiving opening in said receiver has an oval cross-sectional outline.

9. The coupling device according to claim 1 wherein said receiver includes at least two mutually parallel receiving openings each for receiving one tubing therein, said duct opening being in communication with the bottom end of said receiving openings.

* * * * *